P. BONVILLAIN.
APPARATUS FOR MAKING PATTERN PLATES.
APPLICATION FILED JAN. 28, 1908.
12,886. Reissued Nov. 24, 1908.
2 SHEETS—SHEET 1.
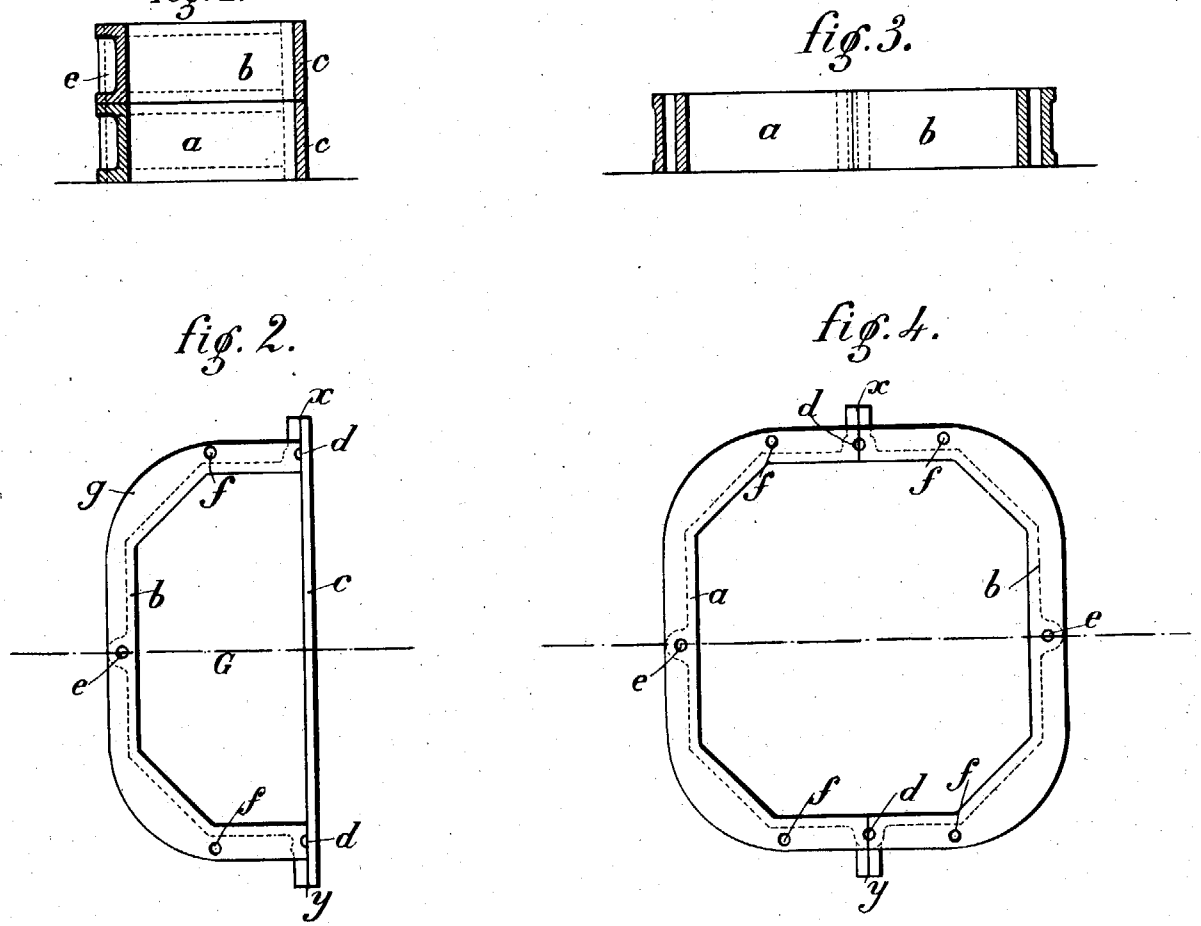
Witnesses:
Harvey L. Lechner
Archworth Martin
Inventor:
Philibert Bonvillain
by atty Paul Synnestvedt
THE NORRIS PETERS CO., WASHINGTON, D. C.

P. BONVILLAIN.

APPARATUS FOR MAKING PATTERN PLATES.

APPLICATION FILED JAN. 28, 1908.

12,886. Reissued Nov. 24, 1908.

2 SHEETS—SHEET 2.

Witnesses:
Harry L. Lechner
Archibald Martin

Inventor:
Philibert Bonvillain
by atty Paul Synnestvedt

THE NORRIS PETERS CO., WASHINGTON, D. C.

UNITED STATES PATENT OFFICE.

PHILIBERT BONVILLAIN, OF PARIS, FRANCE, ASSIGNOR TO E. H. MUMFORD COMPANY, OF PHILADELPHIA, PENNSYLVANIA, A CORPORATION OF PENNSYLVANIA.

APPARATUS FOR MAKING PATTERN-PLATES.

No. 12,886. Specification of Reissued Letters Patent. Reissued Nov. 24, 1908.

Original No. 843,066, dated February 5, 1907, Serial No. 218,627. Application for reissue filed January 28, 1908. Serial No. 413,128.

*To all whom it may concern:*

Be it known that I, PHILIBERT BONVILLAIN, a citizen of the Republic of France, and a resident of Paris, France, have invented certain new and useful Improvements in Apparatus for Making Pattern-Plates, of which the following is a specification.

In mechanical molding, notably, it is common to employ instead of pattern plates known as "pattern-plates", these having upon one face both the lower part and the upper part of a pattern, the two parts being symmetrically disposed. If two moldings be taken from such a pattern-plate in two flasks and then the two flasks be superposed so that the print of each upper part registers with the print of each lower part of the pattern, then two complete moldings of the piece may be obtained therefrom.

This invention has for its object the production of an apparatus for the manufacture of these pattern-plates which shall permit impressions from a pattern without mistakes and with precision, which impressions shall be perfectly symmetrical with respect to a geometrical axis, and also to make the pattern-plates of dimensions to correspond with the molding-flasks in connection with which they are to be used, requiring only a small number of special flasks for the purposes of the invention.

Figure 6:
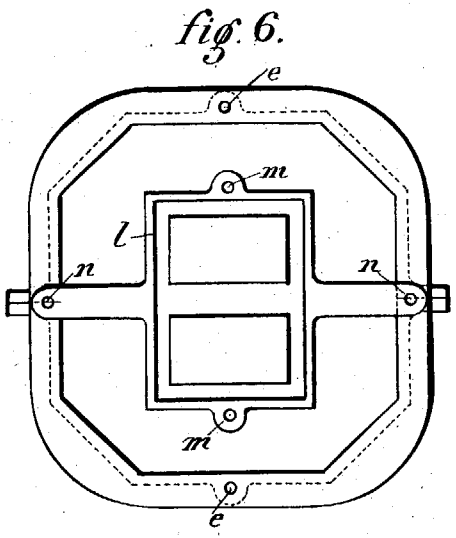
Figure 5:
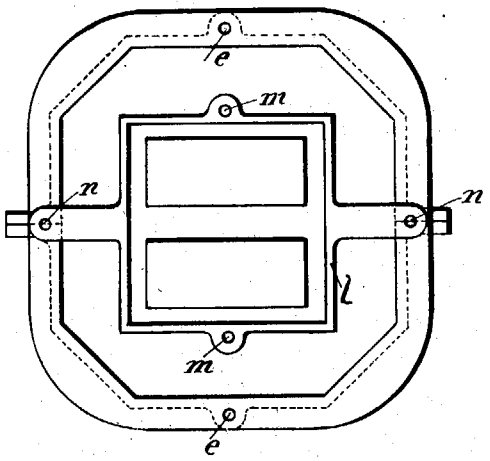

In the accompanying drawings, Figure 1 is a vertical section of a flask of which the two parts are superposed. Figure 2 is a plan view corresponding with Figure 1. Figure 3 is a vertical section through both parts assembled side by side. Figure 4 is a plan view corresponding with Figure 3. Figure 5 is a plan view representing the flask or molding-box, the object of the invention, in combination with a pattern-frame. Figure 6 is a plan view showing a modified arrangement.

The special flask comprises two symmetrical parts *a b* exactly alike and capable of being accurately superposed, as shown in Figure 1. The two parts of this flask are each open on one side, and each of these openings can be closed by a plate, as *c c*, Figures 1 and 2. These two parts of the special flask are carefully matched in order that they may be mounted one upon the other or placed side by side with perfect accuracy, as shown in Figures 3 and 4, and each of them has two half-holes *d d*, disposed on the line *x y*, and holes *e e* on a line perpendicular to the line *x y*, the half-holes *d d* being equally distant from the holes *e e*, so that when the parts *a* and *b* of the flask are placed one upon the other, Figures 1 and 2, the four half-holes *d d* on joint plane *x y* and the two holes *e e* are alined, while when the two parts are arranged side by side, Figures 3 and 4, the centers of the two complete holes formed by the four half-holes *d d* and the centers of the two holes *e e* are located exactly at the four corners of a perfect square.

In a foundry the flasks *a b* are chosen of such form and size that they will accommodate the largest patterns with which they are intended to be used. These flasks are pierced with holes *f* to facilitate moving or opening by an appropriate means, and the straight line joining the axes of these holes *f* passes through the center of gravity of each half of the flask.

The mode of employing these special flasks is as follows: At first a sand mold is made with or from the pattern by employing both parts *a* and *b* of the special molding-box disposed one above the other, their right-hand sides being closed by plates *c c*, as shown in Figure 1. In this molding the patterns are located in the most convenient manner without regard to the position of the holes *e e* or *d d*. For instance, if these patterns are long pieces they should be placed parallel to the longer axis of the box, and if they are wide pieces they should be located so as to avoid unnecessary loss of available space and, in fact, in the best possible manner to include them in the molding-boxes without regard to the pin-line being either parallel or perpendicular to the main axis. This being done, part *b* is lifted vertically from part *a* by suitable mechanical devices, as already alluded to, and the plates *c c* having been removed the parts *a* and *b* are placed side by side, as shown in Figures 3 and 4. The pattern being then removed from the sand, the pattern-plate is cast.

It generally occurs that the castings in the flask *a b* do not occupy the entire space in this flask, and under these conditions it is not necessary to make the pattern-plate as large as the flask, and for the molding of it the form of flask is chosen, according to the arrangement of the prints or impressions and so that it will contain these with sufficient space around them and so that the pattern-frame 1 may be conveniently placed upon the mold, Figures 5 and 6. This pattern-frame 1 is furnished with ears pierced with openings *m*. The pattern-frame 1 being placed upon the flask *a b*, spindles are introduced and perfectly adjusted in the openings *n* and *d* or *e*, and plaster or cement is poured into the flask and left until it is sufficiently hard. Then on removing the spindles, which have been carefully placed in the openings *m*, Figures 5 and 6, before the material is set they leave in the mass two openings, which later serve in fixing the pattern-plate upon the molding-machine and also for locating the flask employed in the molding upon this plate, so as to insure perfect regularity of all the castings obtained by this process.

The openings in the pattern-frame 1 are separated by the same distance as the openings for the spindles of the ordinary molding-flask.

Figure 5 represents the position of a pattern-frame 1 for providing for prints smaller than the available surface of the special flask *a b*. Figure 6 represents the position of a pattern-frame 1 for a rectangular print of which the longest side is perpendicular to the line *x y*. In either of these two cases the pattern-frame 1 may be turned ninety degrees if it be desired to change the position of the longer axis of the pattern with respect to the joint plane of the flasks.

Instead of making the pattern-plate larger than the molding flask, as is the general practice, it is preferable to make it of the same dimensions as the flask.

The pattern-frame 1 serves, when the mold to be made is much smaller than the flask, to make a pattern which has only the necessary dimensions. With this pattern so made one may employ flasks having only the dimensions of the particular frame 1. Without the frame 1 or one having the same dimensions it would be necessary to employ flasks having the dimensions of the frames.

Having now fully described my invention, what I claim as new herein, and desire to secure by Letters Patent, is:—

1. In an apparatus for the manufacture of symmetrical pattern-plates, the combination of two similar half-flasks, removable plates for closing the sides of these flasks, the half-flasks being provided with half openings in the plane of junction and with openings in a plane perpendicular to the plane of junction, the parts being arranged to form a complete flask of which the sides are pierced with holes located at the corners of a square, and a pattern-frame having arms pierced with holes at the same distance from each other as those in the half-flasks, substantially as described and for the purpose specified.

2. In an apparatus for the manufacture of pattern plates, the combination of two similar half-flasks, removable plates for closing the sides of these flasks, a plurality of pattern frames of different sizes, each of which is adapted to fit inside the flasks, and means whereby the pattern frame is positioned with its center-line over the line of joinder of the half-flasks when they are placed side by side.

3. In apparatus for the manufacture of pattern-plates, the combination of two similar half-flasks, removable plates for closing the sides of these flasks, a pattern-frame adapted to fit inside the half flasks, and means whereby the pattern-frame is positioned with its counter-line over the line of joinder of the half flasks when they are placed side by side and holes through the pattern-frame in positions corresponding to those of the pins on the flask with which the pattern-plate is to be used.

4. In an apparatus for the manufacture of pattern-plates, the combination of two similar half-flasks each having a removable side plate whereby the half-flasks may be matched together to form a single flask when the two side plates are removed and a pattern-frame adapted to fit inside the assembled half-flasks and provided with means whereby it is centered on the half-flasks and having other positioning means located on opposite sides of its center-line and inside the assembled half-flasks.

5. In an apparatus for the manufacture of pattern plates, the combination of two similar half-flasks which may be matched together to form a single flask, and a plurality of pattern frames of different sizes, each of which is adapted to fit inside the assembled half-flasks and each of which is provided with a pair of projecting arms having means engaging the flasks whereby the frame is centered thereover.

In testimony whereof I have hereunto signed my name in the presence of the two subscribed witnesses.

PHILIBERT BONVILLAIN.

Witnesses:

DEAN B. MASON,
JULIEN CANERUE.